United States Patent [19]

Tiroux et al.

[11] 4,369,259

[45] Jan. 18, 1983

[54] COLOR-STABILIZED PHENOLIC FOAMS

[75] Inventors: Josef Tiroux, Troisdorf-Oberlar; Franz Weisselfels, Siegburg, both of Fed. Rep. of Germany

[73] Assignee: Dynamit Nobel AG, Cologne, Fed. Rep. of Germany

[21] Appl. No.: 342,342

[22] Filed: Jan. 25, 1982

[30] Foreign Application Priority Data

Jan. 23, 1981 [DE] Fed. Rep. of Germany ....... 3102066

[51] Int. Cl.$^3$ ............................................. C08J 9/00
[52] U.S. Cl. ..................................... 521/108; 521/85; 521/132; 521/181; 524/414
[58] Field of Search ................ 524/414; 521/108, 181, 521/132, 85

[56] References Cited

U.S. PATENT DOCUMENTS 2,186,687  1/1940  Thompson et al. ................ 524/414
3,383,338  5/1968  Wells et al. .......................... 521/108
3,409,571  11/1968  Shepard et al. ..................... 521/108
3,541,046  11/1970  Kerst .................................... 521/108
3,673,130  6/1972  Papa et al. .......................... 521/108

Primary Examiner—Morton Foelak
Attorney, Agent, or Firm—Felfe & Lynch

[57] ABSTRACT

The present invention relates to foams made of resol-type phenolic resins which do not discolor as quickly as prior-art phenolic foams. With the additive in accordance with the invention, even colored foams will not darken as readily. The foams in accordance with the invention contain as stabilizers salts of phosphinic acid or phosphonic acid, such as the primary alkali phosphites or the alkali phosphinates. The stabilizers, which protect the foams against the action of light and/or air and/or heat, are used in amounts ranging from 0.1 to 5 weight percent. The present invention further relates to methods of preparing such foams. In a preferred method, the stabilizers are admixed with an expandable resol-type phenolic resin, the mixture so obtained is mixed with the other substances necessary to formation of a foam, and the whole mixture is then foamed conventionally.

9 Claims, No Drawings

COLOR-STABILIZED PHENOLIC FOAMS

The present invention relates to foams of resol-type phenolic resins which, through the addition of specific stabilizers, are less prone to change color under the action of light and/or heat than prior-art phenolic foams.

It is known that the resistance of solid articles made wholly or largely of cured phenol-formaldehyde resins to color changes due to the direct action of light and/or air and/or heat is rather low by comparison to many other cured synthetic resins based on urea or melamine-formaldehyde resins, epoxy resins or polyester resins, for example. Depending on the type of phenolic resin (novolac or resol) involved, the curing method, and the intensity of the action of light and/or air and/or heat, cured phenolic resins will change in color from their natural white or yellowish color to yellow-brown and progressively to brown, maroon, dark brown and almost black.

When colorants are to be incorporated in phenolic resins or shaped articles made of cured phenol-formaldehyde resins, the choice therefore will generally be limited to relatively dark colors, such as dark red, brown, black, etc.; or, depending on the end use of the shaped articles, the addition of dyes and/or pigments is dispensed with altogether.

This is why phenolic resins are used to make, or are used as binders in making, cast-resin reproductions, foams for a variety of mainly technical uses, compression-molded parts, casting compounds, laminates, molding sands for metal casting, organic and inorganic fiber mats, shaped coals, grinding wheels, friction linings, etc. In these applications, color changes are of minor importance.

However, there are uses for phenolic foams, for example, as holders for cut flowers, where maximum stability of the usually green-colored foams is desired for at least a limited time (2 to 12 months, for example) from the time they are produced to the time they are placed into service; and their service life is also limited (to about 1 to 3 months). These phenolic cut-flower-holder foams are hard, brittle foams with fine and mostly open cells, generally produced from liquid expandable resol-type phenolic resins by the use of organic sulfonic acids, such as para-toluenesulfonic acid or para-phenolsulfonic acid, and dyes which over the acid range are substantially stable at least for a short time, for example, malachite green, a triphenylmethane dye.

The acid-resistant green dyes such as triphenylmethane dyes which are suited for the production of such foams as a rule have poor lightfastness. Because of the poor stability of the natural color of cured phenolic resins and the poor lightfastness which the dyes adapted to them may have, prior-art phenolic foams possess inadequate color stability. Depending on the intensity of the action of light and/or air and/or heat on these foams, their color will change from green to violet or gray or brown within a period of 2 to 30 days. Uncolored foams of this type usually change from white grading into pink (the color which they have immediately after production) to brown or maroon.

In connection with the relatively low color stability of such uncolored or green-colored foams, it is difficult if not impossible to determine the effect of light separately from interactions due to the additional effect of air and/or heat. Through a physical loosening of the structure, all of these factors can promote degradation by ultraviolet light.

Thus there has been a need for substantially increasing the resistance of uncolored phenolic resins, foams or phenolic resins foams which have been colored green with triphenylmethane dyes, to color changes due to the action of light and/or air and/or heat at least for a limited time without adversely affecting important other general requirements which expandable phenolic resins or the foams produced from them must meet. These requirements include:

(a) Sufficient storage life-time of the expandable phenolic resins.

(b) No adverse effect on the foaming and curing behavior of resol-type resins or expandable phenolic resin/curing agent/blowing agent/colorant mixtures, such as prolongation or even suppression of the foaming and curing process, formation of cavities, etc.

(c) No impairment of important properties affecting the end use of the foams, such as a change in the optimum proportion of closed or open cells, a change in average cell diameter, foam density or mechanical properties and, in the case of phenolic foams intended for use as cut-flower holders, a change in water absorption-speed and water-retention.

SUMMARY OF THE INVENTION

By way of filling said need, foams of resol-type phenolic resins having less tendency to undergo color changes and characterized in that they further contain salts of phosphinic acid or phosphonic acid have now been developed.

While it is known to add triaryl phosphites to resol-type phenolic resins during their preparation to prevent the discoloration or brown coloration which usually occurs during the heat-curing of such resins, the addition of such compounds to expandable resol-type phenolic resins either causes the foam to collapse or results in an undesired high density of the foam. Moreover, the color-stabilizing effect of such compounds is inadequate. This is true also of dicarboxylic acid esters of pentaerythrityl phosphite and of various alkyl and aryl phosphites which have been described in the past either as light stabilizers or as antioxidants and stabilizers for polyester, epoxy and alkyd resins as well as for polyvinyl chloride, polyamides and cellulose derivatives. (See U.S. Pat. No. 3,634,317 and German patent application DOS No. 25 06 207.)

Surprisingly, however, the salts of phosphinic acid and phosphonic acid impart to foams formed from resol-type phenolic resins in the presence of acids, at room temperature or slightly elevated temperature, increased resistance to color changes due to the direct action of light and/or air and/or heat. The undesired side effects mentioned above then are not encountered in the production of the foams, and the foams obtained possess the desired practical properties. In the production of the foams in accordance with the invention, the usual formulation need not be adjusted to make certain that the desired practical properties are obtained.

The foams in accordance with the invention are therefore produced conventionally by foaming and curing an expandable mixture of resol-type phenolic resin, blowing agent, curing agent, surfactants and optionally colorants and/or other additives such as fillers or flame retardants. The preferred blowing agents are low-boiling hydrocarbons which at room temperature are liquid, such as n-pentane, and the preferred curing agents, aromatic sulfonic acids or hydrochloric acid. The kinds and amounts of the surfactants used have an effect on the porosity of the foam obtained. Those skilled in the art will know how to proportion them to produce the desired effect on the cell structure.

The phosphonic or phosphinic acid salts may be admixed with the mixture at any desired stage before the foaming operation. For example, the salts may be premixed with the resol-type phenolic resin, optionally together with the surfactants, this mixture then being mixed with the other components. This is the preferred procedure. However, the components of the expandable mixture may also be mixed with the salts all at once.

In many cases, and especially when the salts are added to a premix, it will be advantageous to dissolve or disperse the salts in water and to add these solutions or dispersions to the expandable resol-type resin mixture. In this way, uniform distribution of the stabilizing salts in the mixture to be expanded and in the phenolic foam produced therefrom will be quickly secured.

The stabilizers used in accordance with the invention comprise the inorganic salts of phosphinic acid and phosphonic acid. Phosphinic acid has the general formula $H_2P(O)OH$. In its salts, known as phosphinates or hypophosphites, only the hydrogen atom bound to the oxygen is replaced by a metal equivalent. The metal salts preferably used are the alkali metal salts of the formula $MeH_2PO_2 \cdot xH_2O$.

The salts of phosphinic acid which may also be used in accordance with the invention are known as phosphonates and as primary and secondary phosphites. They are derived from phosphonic acid, $HP(O)(OH)_2$, and one or both of the hydrogen atoms bound to the oxygen may be replaced by a metal equivalent. The phosphonates preferably used are those of the alkali metals, $MeH_2PO_3$ and $Me_2HPO_3$ (Me=Na or K), and the corresponding calcium salts.

The amount of stabilizer to be used in accordance with the invention is at least 0.1 weight percent, based on the finished foam. Preferably amounts ranging from 0.3 to 1.0 weight percent, based on the weight of the finished foam, are used. As a rule it is not necessary to use more than 5 weight percent to achieve the effect in accordance with the invention, although in principle it is possible to use still larger amounts.

The color-stabilizing effect of the additives in accordance with the invention is best assessed or demonstrated in accelerated tests by illuminating foam samples with lamps whose spectral energy distribution comes close to that of sunlight and which also heat the samples. It has been found that when stabilized foams are exposed to the light of a 300-watt bulb (Osram-Vitalux ®) from a distance of 50 cm, approximately tenfold acceleration can be secured by comparison with the effect of strong natural sunlight, and this has made it possible to determine the long-time effect of the stabilizers in accordance with the invention.

EXAMPLE 1

For production of substantially closed-cell phenolic foams, 2.5 g of various phosphinates or hypophosphites was dissolved at 20° C. in 500 g of a commercial foamable resol-type phenolic resin (product T 612 of Dynamit Nobel AG, Troisdorf), and 60 cm³ n-pentane was then added to the mixture with stirring. A relatively stable emulsion thus formed. To initiate an exothermic foaming and curing reaction, 20 cm³ of a 65% aqueous solution of para-phenolsulfonic acid was then added to the emulsion with stirring. The expandable mixture so prepared was poured into paper bags (diameter, 170 mm; height, 400 mm), which were then placed in a circulating-air heating cabinet (air temperature, 50° C.). The mixtures foamed within 5 to 15 minutes and the foam, which at first resembled whipped cream, set within another 30 minutes into a hard, brittle phenolic foam.

The expandable resol-type phenolic resin T 612 S used in the tests had the following properties:
Viscosity at 20° C. (after Hoeppler): 2500 cp
Solid resin content: 72 wt. %
pH value: 8.0
Water content (according to K. Fischer): 18 wt. %
The following color stabilizers were used:
A = Potassium hypophosphite
B = Sodium hypophosphite
C = Sodium phosphite
D = No color stabilizer The usually cylindrical foam specimens were allowed to cool and were then sawn through, to the extent possible, approximately in the middle in a direction normal to the foaming direction. All specimens were then examined with regard to their structure. In all specimens, the resol-type phenolic resin was found to have fully and perfectly foamed in the paper bags serving as molds. In the tables which follow, the foam structure is characterized as follows:

cc = Coarse-celled foam, average cell diameter over about 0.4 mm mc = Medium-size cells, average cell diameter between 0.3 and 0.4 mm mfc = Medium-size to fine cells, average cell diameter between 0.2 and 0.3 mm fc = Fine-celled foam, average cell diameter under 0.2 mm In Tables 1 and 2, the density of the foam is given as a further general criterion for its evaluation.

For evaluation of the resistance of the foam, whose color upon production ranged from white to yellow or to a pale pink, to color changes due to the action of light and/or heat, cylindrical foam specimens (diameter, 30 mm; height, 60 mm) were exposed for different lengths of time to the light from a 300-watt bulb (Osram-Vitalux ®) located 50 cm away, or kept for 96 hours in a heating cabinet with a circulating-air temperature of 60° C. During these tests, the color of the specimens changed in part to brown or maroon, as it would have in the course of normal storage for a period of weeks or months.

The color changes which the specimens underwent under the action of light and/or heat were compared with the color of a material (standard sample) not exposed to the action of light and/or heat by means of a filter-type colorimeter (Zeiss Mod. RFC 3) in conformity with DIN 5033 over the range from 400 to 699 nanometers with light of the type D 65 (daylight). The values so obtained are presented in Tables 1 and 2, where:

---

$\Delta L$ = Deviation in shade: + Specimen is lighter / − Specimen is darker } than the standard sample -continued ΔE = Cumulative total of red/green and yellow/blue deviation On the basis of these comparative measurements, the specimen which registers the greatest positive ΔL deviation from the D sample and also the smallest ΔE value exhibits the least color change or the highest resistance to color change due to the action of light and/or heat. The results of tests involving specimens stored for 48 hours at 60° C. are presented in Table 1. The densities given were determined along with the cell structure of the finished foams before the latter were exposed to light or heat.

COMPARATIVE EXAMPLE

By the procedure followed in Example 1, an expandable mixture of the same composition was prepared, except that in place of the phosphinates or phosphites in accordance with the invention triphenylphosphite and trisnonylphenylphosphite, respectively, was used.

The mixture containing trisnonylphenylphosphate collapsed after foaming, which means that this additive prevents proper foaming and curing.

The foam containing triphenylphosphite had collapsed edges and nearly the same colorimetric values as the untreated foam mentioned in Example 1. Its density was 29.1 kg/m³ and thus even higher than that of the foam containing no stabilizer. From this it follows that triphenylphosphite is totally unsuited for imparting the desired stabilization.

TABLE 1

(test series VE 950)

| Stabilizer | A | B | C | D |
|---|---|---|---|---|
| Foam structure | mfc | mc | mc | mc |
| ΔL (in conformity with DIN 5033) | −23 | −27 | −40 | −43 |
| ΔE (in conformity with DIN 5033) | 29 | 36 | 50 | 50 |
| Foam density (kg/m³) | 26.3 | 25.7 | 27.2 | 25.9 |

TABLE 2

| Stabilizer | A | B | C | D |
|---|---|---|---|---|
| Foam structure | mfc | mc | mc | mc |
| ΔL (in conformity with DIN 5033) | −26 | −30 | −34 | −38 |
| ΔE (in conformity with DIN 5033) | 34 | 37 | 42 | 45 |
| Foam density (kg/m³) | 26.3 | 25.7 | 27.2 | 25.9 |

EXAMPLE 2

The procedure used in Example 1 was followed to produce a substantially open-celled, green-colored phenolic foam as used in cut-flower holders, except that in place of the resin there employed a resin marketed by Dynamit Nobel AG, Troisdorf, as Resol-Type Phenolic Resin T 910 S was used which had first been colored by the addition of 0.4 weight percent of a 50% malachite-green solution in aqueous acetic acid.

Because of the high proportion of open cells, such foams when placed on a water surface usually absorb within a few minutes more than 90 percent by volume of water. The proportion of open cells is an important criterion for the quality of such foams and therefore has been included in this series of tests by measurement of the water-absorption times. To determine these times, cylindrical specimens (diameter, 81 mm; height, 60 mm) were cut from the test foams and after 16 to 24 hours' open storage (for pentane-air exchange) placed on a water surface (water temperature, 20° C.) and the time which elapsed until the test specimens were saturated with water or appeared fully wetted was determined.

The color changes produced by exposing the specimens to light were evaluated as described in Example 1.

The results are presented in Table 3, which includes comparative tests run with triphenylphosphite (E) and trisnonylphenylphosphite (F). These stabilizers, which are not covered by the invention, produced practically no improvement in the color values although the foam properties on the whole were not poorer, with the exception of the compression strength in test E. All formulations had foamed completely and satisfactorily in the paper bags serving as molds.

TABLE 3

| Stabilizer | A | B | C | D | E | F |
|---|---|---|---|---|---|---|
| Foam structure | mfc | mfc | mfc | mfc | fc | mfc |
| ΔL (DIN 5033) | −15 | −14 | −17 | −21 | −23 | −26 |
| ΔE (DIN 5033) | 28 | 30 | 32 | 43 | 43 | 43 |
| Density (kg/m³) | 23.9 | 23.1 | 22.3 | 21.9 | 22.6 | 21.9 |
| Compressive strength (g/cm²) | 1280 | 1250 | 1160 | 1150 | 1170 | 860 |
| Rate of water absorption (minutes and seconds) | 3'35" | 3'52" | 3'05" | 3'48" | 3'07" | 1'28" |

It will be appreciated that the instant specification and examples are set forth by way of illustration and not of limitation, and that various changes and modifications may be made without departing from the spirit and scope of the present invention.

What is claimed is:

1. Foam of resol-type phenolic resins resistant to color change, comprising at least one of alkali metal or calcium salt of phosphinic acid or phosphonic acid, as a stabilizer.

2. Foam as claimed in claim 1, containing from 0.1 to 5.0 weight percent of at least one salt of phosphinic acid or phosphonic acid.

3. Foam as claimed in claim 1, containing from 0.3 to 1.0 weight percent of at least one salt of phosphinic acid or phosphonic acid.

4. Foam as claimed in claim 1, containing an alkali metal salt of phosphinic acid and phosphonic acid.

5. Foam as claimed in claim 1, colored with a triphenylmethane dye.

6. Process of preparing a foam as claimed in claim 1, which comprises admixing an expandable resol-type phenolic resin with a stabilizer selected from salts of phosphinic acid and phosphonic acid, and processing the mixture so obtained with blowing agents, curing agent, surfactants and optionally colorants into said foam.

7. Process as claimed in claim 6, which comprises admixing the said stabilizer with an expandable mixture of resol-type phenolic resin, blowing agents, curing agents and optionally colorants, before said mixture is foamed and cured, and then conducting foaming and curing.

8. Method as claimed in claim 7, wherein said stabilizer is an aqueous solution.

9. Foam as claimed in claim 1 wherein said salt is an alkali metal salt of phosphinic acid.

* * * * *